United States Patent
You et al.

(10) Patent No.: US 10,326,185 B2
(45) Date of Patent: Jun. 18, 2019

(54) BATTERY MODULE INCLUDING ARRAY OF COOLING FINS HAVING DIFFERENT THICKNESSES

(71) Applicant: LG CHEM, LTD., Seoul (KR)

(72) Inventors: Jung-Been You, Daejeon (KR); Jung-Hang Lee, Daejeon (KR); Bo-Hyon Kim, Daejeon (KR); Hyun-Young Cho, Daejeon (KR); Yun-Ki Choi, Daejeon (KR); Jong-Soo Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 8 days.

(21) Appl. No.: 15/555,730

(22) PCT Filed: Sep. 21, 2016

(86) PCT No.: PCT/KR2016/010535
§ 371 (c)(1),
(2) Date: Sep. 5, 2017

(87) PCT Pub. No.: WO2017/052194
PCT Pub. Date: Mar. 30, 2017

(65) Prior Publication Data
US 2018/0062225 A1    Mar. 1, 2018

(30) Foreign Application Priority Data
Sep. 21, 2015    (KR) .................. 10-2015-0133022

(51) Int. Cl.
*H01M 2/10*    (2006.01)
*H01M 10/6551*    (2014.01)
(Continued)

(52) U.S. Cl.
CPC ......... *H01M 10/6551* (2015.04); *H01M 2/10* (2013.01); *H01M 2/1072* (2013.01);
(Continued)

(58) Field of Classification Search
CPC ......... H01M 10/6551; H01M 10/6555; H01M 2/1077; H01M 2/1072; H01M 10/617;
(Continued)

(56) References Cited

U.S. PATENT DOCUMENTS

| | | | |
|---|---|---|---|
| 5,731,568 A * | 3/1998 | Malecek ............ | B60H 1/00278 180/68.5 |
| 2012/0009455 A1* | 1/2012 | Yoon ................... | H01M 10/653 429/120 |

(Continued)

FOREIGN PATENT DOCUMENTS

| | | |
|---|---|---|
| DE | 10 2008 034 869 A1 | 6/2009 |
| JP | 2009-301877 A | 12/2009 |

(Continued)

OTHER PUBLICATIONS

International Search Report for PCT/KR2016/010535 (PCT/ISA/210) dated Dec. 8, 2016.

*Primary Examiner* — Cynthia K Walls
(74) *Attorney, Agent, or Firm* — Birch, Stewart, Kolasch & Birch, LLP

(57) ABSTRACT

A battery module including an array of cooling fins having different thicknesses is provided. The battery module includes: a plurality of battery units arranged in one direction; a plurality of cooling fins between adjacent battery units; and a heat sink coupled to ends of the plurality of cooling fins, wherein each cooling fin has a structure in which a pair of sub-cooling fins are face-to-face coupled to each other, and thicknesses of the plurality of cooling fins are reduced toward the side region from the central region due to a difference in a thickness of at least one of the pair of sub-cooling fins. Since heat is not accumulated at the central region, the battery module has uniform temperature distribution while being charged or discharged.

11 Claims, 13 Drawing Sheets

(51) Int. Cl.
*H01M 10/6567* (2014.01)
*H01M 10/617* (2014.01)
*H01M 10/6554* (2014.01)
*H01M 10/6556* (2014.01)
*H01M 10/613* (2014.01)
*H01M 10/6555* (2014.01)

(52) U.S. Cl.
CPC ....... *H01M 2/1077* (2013.01); *H01M 10/613* (2015.04); *H01M 10/617* (2015.04); *H01M 10/6554* (2015.04); *H01M 10/6555* (2015.04); *H01M 10/6556* (2015.04); *H01M 10/6567* (2015.04)

(58) Field of Classification Search
CPC ........... H01M 10/613; H01M 10/6556; H01M 10/6554; H01M 2/10; H01M 10/6567
See application file for complete search history.

(56) References Cited

U.S. PATENT DOCUMENTS

| | | | |
|---|---|---|---|
| 2012/0094166 A1* | 4/2012 | Lee | B60L 11/1874 |
| | | | 429/120 |
| 2012/0298433 A1 | 11/2012 | Ohkura | |
| 2013/0224549 A1* | 8/2013 | Lee | H01M 10/625 |
| | | | 429/99 |

FOREIGN PATENT DOCUMENTS

| | | |
|---|---|---|
| JP | 2011-165361 A | 8/2011 |
| JP | 2013-038001 A | 2/2013 |
| JP | 2013-225432 A | 10/2013 |
| JP | 2015-76187 A | 4/2015 |
| KR | 10-1071537 B1 | 10/2011 |
| KR | 10-1259757 B1 | 5/2013 |
| KR | 10-2015-0037335 A | 4/2015 |
| WO | WO 2011/061931 A1 | 5/2011 |

* cited by examiner

BATTERY MODULE INCLUDING ARRAY OF COOLING FINS HAVING DIFFERENT THICKNESSES

TECHNICAL FIELD

The present disclosure relates to a battery module including an array of cooling fins having an improved structure, capable of uniformly cooling the temperature of battery cells of the battery module regardless of their locations.

The present application claims priority to Korean Patent Application No. 10-2015-0133022 filed on Sep. 21, 2015 in the Republic of Korea, the disclosure of which is incorporated herein by reference.

BACKGROUND ART

Recently, to reduce atmospheric contamination by exhaust gases from automobiles, automobiles are manufactured based on a study for securing driving power by using an internal combustion engine and/or an electric motor. Therefore, the automobiles have evolved in a sequence of hybrid automobiles, plug-in hybrid automobiles, and electric automobiles.

The hybrid automobiles and the plug-in hybrid automobiles include an internal combustion engine, an electric motor, and a battery pack. The electric automobiles include an electric motor and a battery pack without an internal combustion engine.

The battery pack includes at least one battery module and includes an air-cooled or water-cooled cooling mechanism.

For example, JP2013-038001A discloses a battery pack including a plurality of cooling fins, a plurality of battery cells, and a heat-absorbing body. The cooling pins have a plate shape and are erected on the heat-absorbing body and arranged in a line. The battery cells are located between the cooling fins on the heat-absorbing body. The heat-absorbing body receives a coolant through one side and discharges the coolant through another side.

The cooling fin contacts the battery cell and the heat-absorbing body. The battery cell generates heat during repeated charging and discharging operations. Heat from the battery cell is conducted to the heat-absorbing body through the cooling fin. The heat-absorbing body exchanges heat with the cooling fin through the coolant.

Meanwhile, in the array of the battery cells, the temperature of the battery cell located at the central portion rises relatively faster than the temperature of the battery cell located at the outer portion. This is because heat generated from the battery cell located at the outer portion is transferred to the battery cell of the central portion and accumulated there. The accumulation of heat increases a deterioration speed of the battery cell located at the central portion. Consequently, the life of the battery pack becomes shorter than design specification, which shortens an exchange period of the battery pack and thus becomes a cause of an economic burden.

Meanwhile, U.S. 2012/0009455A discloses a battery module including: a plurality of adjacent battery cells; heat transfer sheets located between the at least several battery cells and configured to exchange heat with the battery cells; a heat dispersion member coupled to the heat transfer sheets and configured to exchange heat with the heat transfer sheets; and a heat dissipation member coupled to the heat dispersion member and configured to exchange heat with the heat dispersion member.

In the battery module disclosed in U.S. 2012/0009455A, an auxiliary heat transfer sheet is additionally inserted between the heat transfer sheets at the central portion and thus the thickness of the entire heat transfer sheet at the central portion is relatively thicker than the thickness of the heat transfer sheets at the outer portion. This structure has been proposed for the purpose of swiftly radiating heat from the battery cells at the central portion from which much heat is generated.

However, when the plurality of heat transfer sheets each having the same thickness are stacked, heat transfer through face-to-face is not swiftly performed between the sheets due to a contact thermal resistance between the sheets.

Therefore, a heat transfer performance of the heat transfer sheet in the inner side is relatively lower than a heat transfer performance of the heat transfer sheet in the outer side. Therefore, to swiftly radiate heat from the central portion, an unexpectedly large number of sheets need to be stacked. Since a stacking structure of the heat transfer sheets deteriorates energy density of the battery pack, it is difficult to apply the stacking structure of the heat transfer sheets to electric automobiles or hybrid automobiles.

DISCLOSURE

Technical Problem

The present disclosure is designed to solve the problems of the related art, and therefore the present disclosure is directed to providing a battery module including an array of cooling fins, which is suitable for uniformly controlling the temperature of an entire battery cell by swiftly radiating heat generated from each battery cell regardless of an arrangement sequence of battery cells during repeated charging and discharging of the battery cells arranged in a line, and which may minimize reduction of energy density of a battery pack.

Technical Solution

In one aspect of the present disclosure, there is provided a battery module including: a plurality of battery units arranged in one direction; a plurality of cooling fins between adjacent battery units; and a heat sink coupled to ends of the plurality of cooling fins, each cooling fin having a structure in which a pair of sub-cooling fins are face-to-face coupled to each other, and the plurality of cooling fins having a reducing thickness toward a side region from a central region thereof due to a thickness difference of at least one of the sub-cooling fins.

Preferably, thicknesses of the plurality of cooling fins may be gradually reduced toward the side region from the central region.

Preferably, the battery module may further include: an outer cooling fin arranged at an outermost part of the plurality of battery units and including one sub-cooling fin.

Preferably, the outer cooling fin may include a metallic plate bent in '⌐' shape or a '└' shape.

Preferably, each of the plurality of cooling fins may have a '⊥' shape.

Preferably, each of the plurality of cooling fins may include a left sub-cooling fin including a metallic bent plate having a '⌐' shape and a right sub-cooling fin including a metallic bent plate having a '└' shape.

According to an aspect, one of the left sub-cooling fin and the right sub-cooling fin facing the central region of the plurality of cooling fins has a greater thickness than a thickness of the other thereof facing the side region of the plurality of cooling fins.

Preferably, each of the rest of battery units except a battery unit located at an outermost side from among the plurality of battery units may face-to-face contact two adjacent cooling fins at opposite sides.

According to an aspect, among the two adjacent cooling fins at opposite sides, a right sub-cooling fin having a 'ㄴ' shape and forming a cooling fin on one side and a left sub-cooling fin having a 'ㄱ' shape and forming a cooling fin on the other side have a same thickness.

In the present disclosure, each of the cooling fins may include a plate-shaped stand bonded on a surface of the heat sink; and a plate-shaped lateral wall vertically protruding and extending from an end of the stand, the lateral wall face-to-face contacting a battery unit facing the lateral wall.

According to an aspect, the stands of the plurality of cooling fins may have a gradually reducing thickness toward an outer side from a central region of an array of the plurality of cooling fins.

Preferably, each battery unit may include at least one battery cell and a cartridge configured to receive the at least one battery cell therein.

According to an aspect, the cartridge may include a window exposing a flat surface of the at least one battery cell, and the flat surface exposed via the window may face-to-face contact a surface of a cooling fin facing the flat surface.

In the present disclosure, the heat sink may include an inlet through which a coolant is introduced and an outlet through which the coolant is discharged. Also, the heat sink may have a cavity structure in which the coolant may flow.

According to an aspect, the heat sink may include a bulk-type metallic plate and may have an uneven structure exposed to an air flow. In this case, the uneven structure may be provided to a surface opposite to a surface on which the cooling fin structure is provided.

Preferably, the pair of sub-cooling fins may be bonded to each other through a thermal conductive adhesive or a thermal conductive double-sided adhesive film.

Advantageous Effects

According to the present disclosure, in an array of a plurality of cooling fins included in a battery module, a heat transfer speed from a central region of the battery module to cooling fins may be increased by increasing a thickness of cooling fins located at the central region of the battery module more than a thickness of cooling fins located at the side region. Consequently, heat accumulation at the central region of the battery module and a local increase of temperature may be prevented, and the temperature may be uniformly cooled regardless of a location in the battery module. Therefore, reduction of a replacement period of the battery module may be prevented.

Also, compared with a related art which implements a cooling fin structure by stacking a plurality of heat transfer sheets each having a same thickness, the present disclosure may increase a heat transfer speed of the central region while minimizing a loss of energy density by allowing only two sub-cooling fins to face-to-face contact to form a cooling fin, adjusting thicknesses of the sub-cooling fins, and thus increasing a thickness of a cooling fin at the central region more than a thickness of a cooling fin at the side region. That is, since a heat conduction performance relative to a thickness of a cooling fin is excellent compared with a related art, the present disclosure is usefully applicable to the technical field of an electric automobile or a hybrid automobile which requires a battery pack having high energy density.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In embodiments described below, a battery cell denotes a pouch type lithium secondary battery. Here, the lithium secondary battery is collectively referred to as a secondary battery in which a lithium ion acts as an operating ion and induces an electrochemical reaction at an anode and a cathode while being charged and discharged. However, it is obvious that the present disclosure is not limited to a specific kind of a battery.

Also, the present disclosure is not limited to a purpose of a battery cell. Therefore, the battery cell according to the present disclosure is applicable to a battery used for various applied products for which a secondary battery is known to be used, for example, mobile devices, power storing apparatuses, unmanned aircrafts such as drones, etc. as well as electric automobiles or hybrid automobiles.

Figure 1:
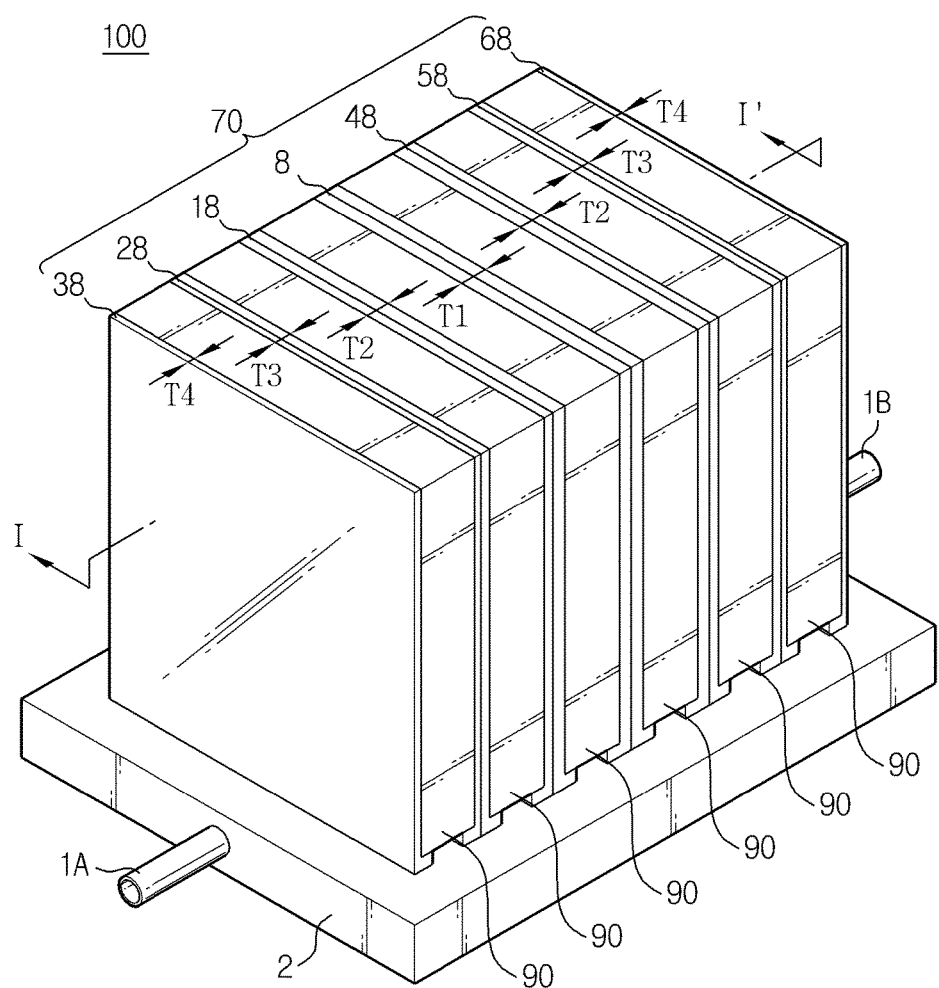
FIG. 1 is a perspective view schematically illustrating a battery module according to a first embodiment of the present disclosure.
Figure 2:
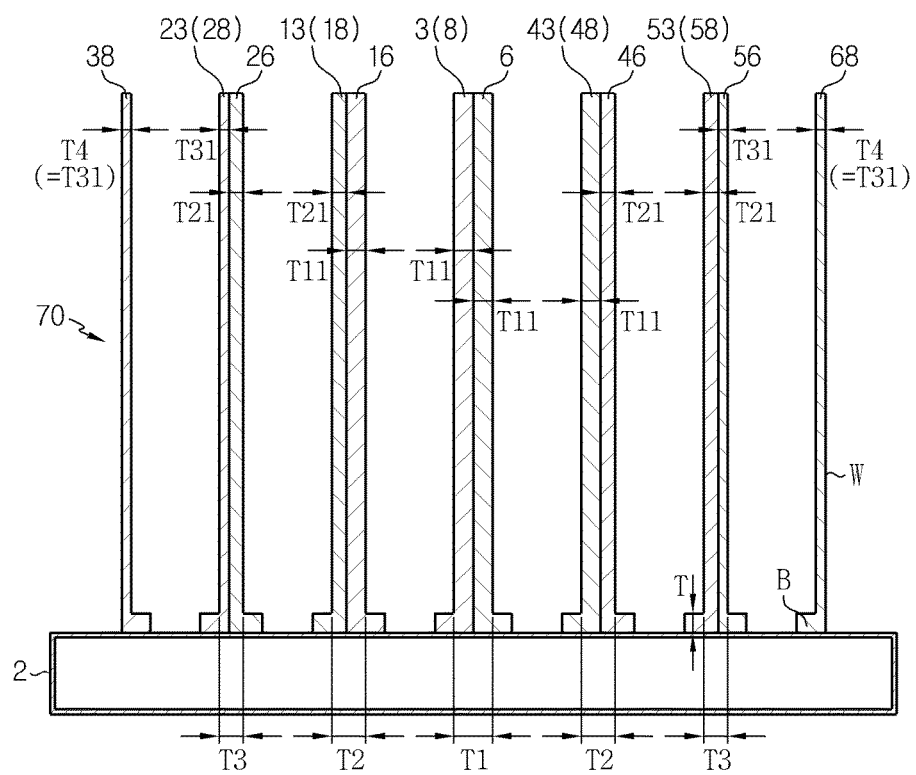
FIG. 2 is a cross-sectional view illustrating a cooling fin structure and a heat sink taken along cut line I-I' of FIG. 1.
Figure 3:
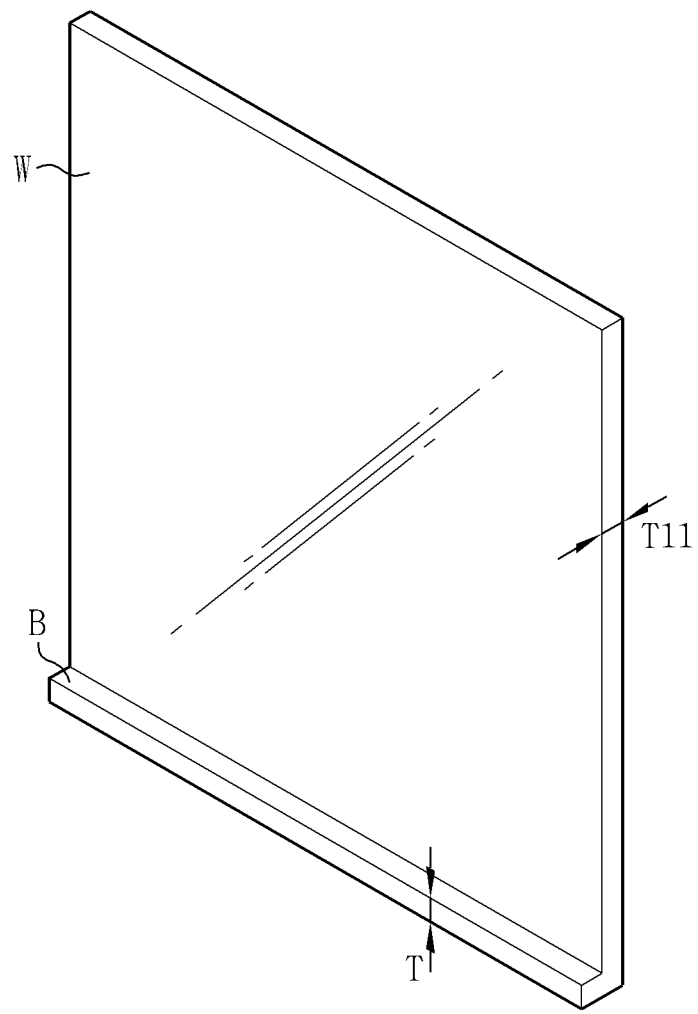
FIG. 3 is a perspective view illustrating a cooling fin of FIG. 1.
Figure 4:
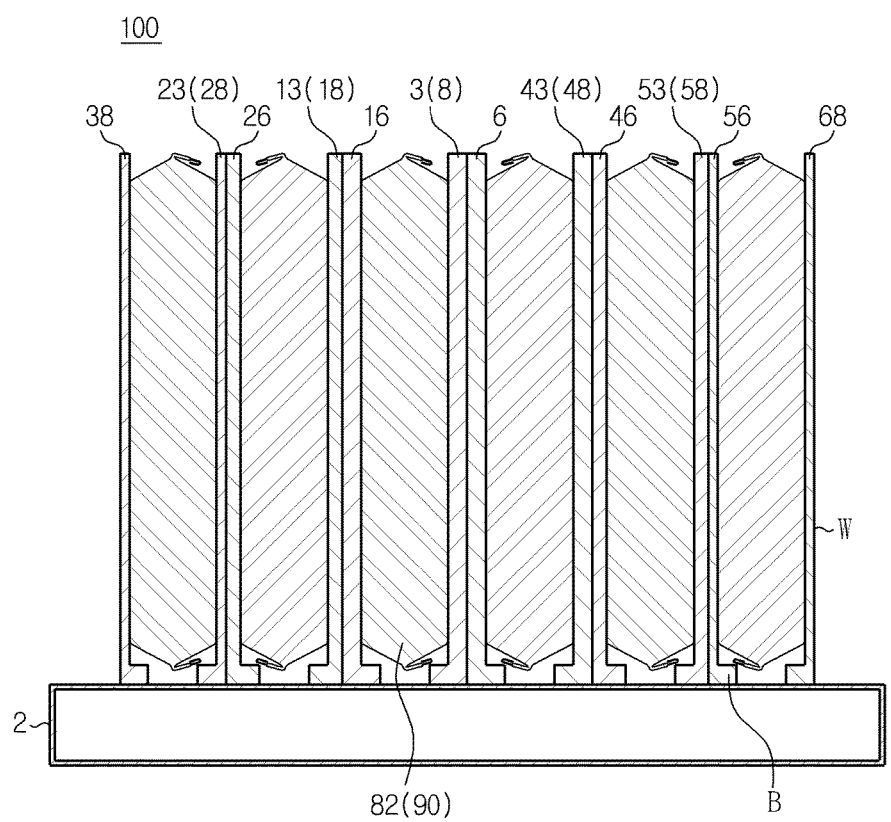
FIG. 4 is a cross-sectional view illustrating the battery module taken along cut line I-I' of FIG. 1.

FIG. 1 is a perspective view schematically illustrating a battery module according to a first embodiment, FIG. 2 is a cross-sectional view illustrating a cooling fin structure and a heat sink taken along cut line I-I' of FIG. 1, FIG. 3 is a perspective view illustrating a cooling fin of FIG. 1, and FIG. 4 is a cross-sectional view illustrating the battery module taken along cut line I-I' of FIG. 1.

Referring to FIGS. 1 to 4, a battery module 100 includes a heat sink 2, a cooling fin array 70 including a plurality of cooling fins 8, 18, 28, 38, 48, 58, and 68, and a plurality of battery units 90.

The heat sink 2 is arranged under the cooling fin array 70 and the plurality of battery units 90. The heat sink 2 receives a coolant (for example, water C (see FIG. 12)) from an inlet 1A located on one side and discharges the coolant C through an outlet 1B located on another side. The coolant C exchanges heat with the cooling fin array 70 while the coolant C passes through the heat sink 2. The heat sink 2 may have a cavity structure through which the coolant may flow.

In another aspect, the heat sink 2 may have an uneven structure in a surface opposite to a surface on which the cooling fin array 70 is provided. The uneven structure may be exposed to an air flow. In this case, the structures for receiving and discharging of the coolant and circulation of the coolant may be selectively omitted from the heat sink 2.

The cooling fin array 70 includes first to seventh cooling fins 8, 18, 28, 38, 48, 58, and 68 arranged in one direction on the heat sink 2. Here, since the number of cooling fins is merely exemplary, the present disclosure is not limited to the number of cooling fins. The first to seventh cooling fins 8, 18, 28, 38, 48, 58, and 68 may include a metallic material having excellent thermal conductivity, and for example, may include copper or aluminum. The fourth cooling fin 38 and the seventh cooling fin 68 arranged at outermost portions from among the cooling fins may be referred to as outer cooling fins.

The first cooling fin 8 is arranged at the central region of the cooling fin array 70. The second to fourth cooling fins 18, 28, and 38 are arranged in the left of the first cooling fin 8 and sequentially arranged toward one side from the central region of the cooling fin array 70.

Similarly, the fifth to seventh cooling fins 48, 58, and 68 are arranged in the right of the first cooling fin 8 and sequentially arranged toward another side from the central region of the cooling fin array 70. Lower ends of the first to seventh cooling fins 8, 18, 28, 38, 48, 58, and 68 contact the heat sink 2.

The plurality of battery units 90 are arranged in spaces between the first to seventh cooling fins 8, 18, 28, 38, 48, 58, and 68. Here, each battery unit 90 may include at least one pouch type battery cell 82 as an example.

The first to seventh cooling fins 8, 18, 28, 38, 48, 58, and 68 surround the plurality of battery units 90 in a sandwich structure on the heat sink 2.

The thicknesses of the first to seventh cooling fins 8, 18, 28, 38, 48, 58, and 68 may be gradually reduced toward a side region from the central region.

Specifically, the first cooling fin 8 is arranged at the center of the cooling fin array 70 and has a thickness T1 greater than those of the second to seventh cooling fins 18, 28, 38, 48, 58, and 68.

Also, the thicknesses of the second to fourth cooling fins 18, 28, and 38 are gradually reduced toward the left direction. That is, the second cooling fin 18 has a thickness T2 greater than those of the third and fourth cooling fins 28 and 38, and the third cooling fin 28 has a thickness T3 greater than a thickness T4 of the fourth cooling fin 38 corresponding to an outer cooling fin.

Similarly, the fifth to seventh cooling fins 48, 58, and 68 are gradually reduced toward the right direction. That is, the fifth cooling fin 48 has a thickness T2 greater than those of the sixth and seventh cooling fins 58 and 68, and the sixth cooling fin 58 has a thickness T4 greater than a thickness of the seventh cooling fin 68 corresponding to an outer cooling fin.

The first to seventh cooling fins 8, 18, 28, 38, 48, 58, and 68 may be symmetric in their locations and thicknesses with respect to the first cooling fin 8.

Outer cooling fins 38 and 68 among the first to seventh cooling fins 8, 18, 28, 38, 48, 58, and 68 may have a '⌐' shape or a '⌐' shape, and the rest of cooling fins 8, 18, 28, 48, and 58 may have a '⊥' shape to surround two battery units 90 in a sandwich structure.

According to an aspect, as illustrated in FIG. 2, each of the first, second, third, fifth, and sixth cooling fins 8, 18, 28, 48, and 58 has a structure in which a sub-cooling fin including a metallic plate bent in a '⌐' shape faces and is coupled to a sub-cooling fin including a metallic plate bent in a '⌐' shape.

That is, the first cooling fin 8 has a structure in which a first left sub-cooling fin 3 having a '⌐' shape is coupled to a first right sub-cooling fin 6 having a '⌐' shape. Also, the second cooling fin 18 has a structure in which a second left sub-cooling fin 13 having a '⌐' shape is coupled to a second right sub-cooling fin 16 having a '⌐' shape. Also, the third cooling fin 28 has a structure in which a third left sub-cooling fin 23 having a '⌐' shape is coupled to a third right sub-cooling fin 26 having a '⌐' shape. Also, the fifth cooling fin 48 has a structure in which a fifth left sub-cooling fin 43 having a '⌐' shape is coupled to a fifth right sub-cooling fin 46 having a '⌐' shape. Also, the sixth cooling fin 58 has a structure in which a sixth left sub-cooling fin 53 having '⌐' shape is coupled to a sixth right sub-cooling fin 56 having a '⌐' shape. Meanwhile, the fourth cooling fin 38 and the seventh cooling fin 68 corresponding to the outer cooling fins respectively include single sub-cooling pins having a '⌐' shape and a '⌐' shape.

The left and right sub-cooling fins may be coupled by using a thermal conductive adhesive, or coupled by using spot welding, laser welding, ultrasonic welding, resistance welding, etc. Also, the left and right sub-cooling fins may be coupled to each other with a thermal conductive double-sided adhesive film therebetween.

When the left and right sub-cooling fins are coupled by using a thermal conductive double-sided adhesive film, a gap between the sub-cooling fins is removed and thus a contact thermal resistance may be further reduced.

For example, for the thermal conductive adhesive, a thermal adhesive SE 4485 by Dao Coning co. may be used. For the thermal conductive double-sided adhesive film, a thermal adhesive pad 5571 by 3M co. may be used.

However, the present disclosure is not limited thereto and any thermal conductive adhesive or thermal conductive double-sided adhesive film as far as it is known to the technical field to which the present disclosure pertains may be used.

Referring to FIGS. 3 and 4, the first left sub-cooling fin 3 includes a plate-shaped stand B attached on a surface of the heat sink 2, and a plate-shaped lateral wall W perpendicularly protruding from an end of the stand B, extending upward, and face-to-face contacting the battery unit 90. The stand B face-to-face contacts the heat sink 2. The stand B may be solidly fixed to a surface of the heat sink 2 through welding. The lateral wall W separates two adjacent battery units 90 by a preset thickness. This structure is applicable to the fourth and seventh cooling fins 38 and 68 arranged at the outermost portion, and other cooling sub-fins 6, 13, 16, 23, 26, 43, 46, 53, and 56. A protruding direction of the stand B may be opposite to that illustrated in FIG. 3 depending on a location of the sub-cooling fin.

Referring to FIG. 2, the first left and right sub-cooling fins 3 and 6 are arranged at the central region of the array of the plurality of battery units 90 and have the lateral walls W of the same thickness T11.

On the contrary, the second left and right sub-cooling fins 13 and 16, the third left and right sub-cooling fins 23 and 26, the fifth left and right sub-cooling fins 43 and 46, and the sixth left and right sub-cooling tins 53 and 56 have lateral walls W of different thicknesses.

Preferably, a lateral wall W of a sub-cooling fin that faces the side region among the left and right sub-cooling fins coupled to each other is thinner than a lateral wall W that faces the central region.

For example, a thickness T21 of a lateral wall W of the second left sub-cooling fin 13 is less than a thickness T11 of a lateral wall W of the second right sub-cooling fin 16. A thickness T31 of a lateral wall W of the third left sub-cooling fin 23 is less than a thickness T21 of a lateral wall W of the third right sub-cooling fin 26. A thickness T11 of a lateral wall W of the fifth left sub-cooling fin 43 is greater than a thickness T21 of a lateral wall W of the fifth right sub-cooling fin 46. A thickness T21 of a lateral wall W of the sixth left sub-cooling fin 53 is greater than a thickness T31 of a lateral wall W of the sixth right sub-cooling fin 56.

According to another aspect, the lateral walls of two sub-cooling fins facing each other and surrounding one battery unit in a sandwich structure may have the same thickness. That is, the fourth cooling fin 38 and the third left sub-cooling fin 23, the third right sub-cooling fin 26 and the second left sub-cooling fin 13, the second right sub-cooling fin 16 and the first left sub-cooling fin 3, the first right sub-cooling fin 6 and the fifth left sub-cooling fin 43, the fifth right sub-cooling fin 46 and the six left sub-cooling fin 53, and the six right sub-cooling fin 56 and the seventh cooling fin 68 may respectively have lateral walls W of the same thicknesses.

Figure 5:
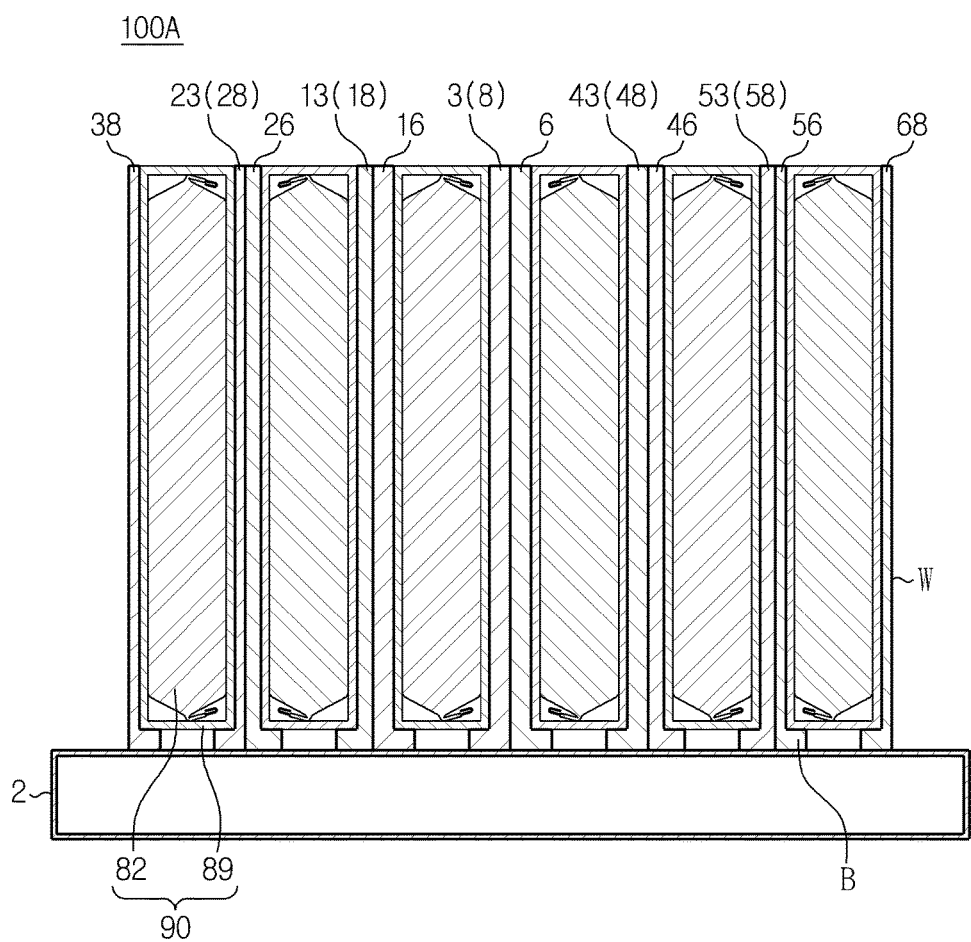
FIG. 5 is a cross-sectional view illustrating a modification of the battery module of FIG. 4.

FIG. 5 is a cross-sectional view illustrating a modification of a battery module of FIG. 4.

Referring to FIG. 5, a battery module 100A includes similar elements to those of the battery module 100 of FIG. 4. However, each of a plurality of battery units 90 in the battery module 100A includes at least one battery cell 82 and a cartridge 89 configured to receive the battery cell 82 therein. Respective cartridges 89 are arranged at the same height level between the plurality of cooling fins 8, 18, 28, 38, 48, 58, and 68, and face-contact cooling fins arranged at left and right.

Figure 6:
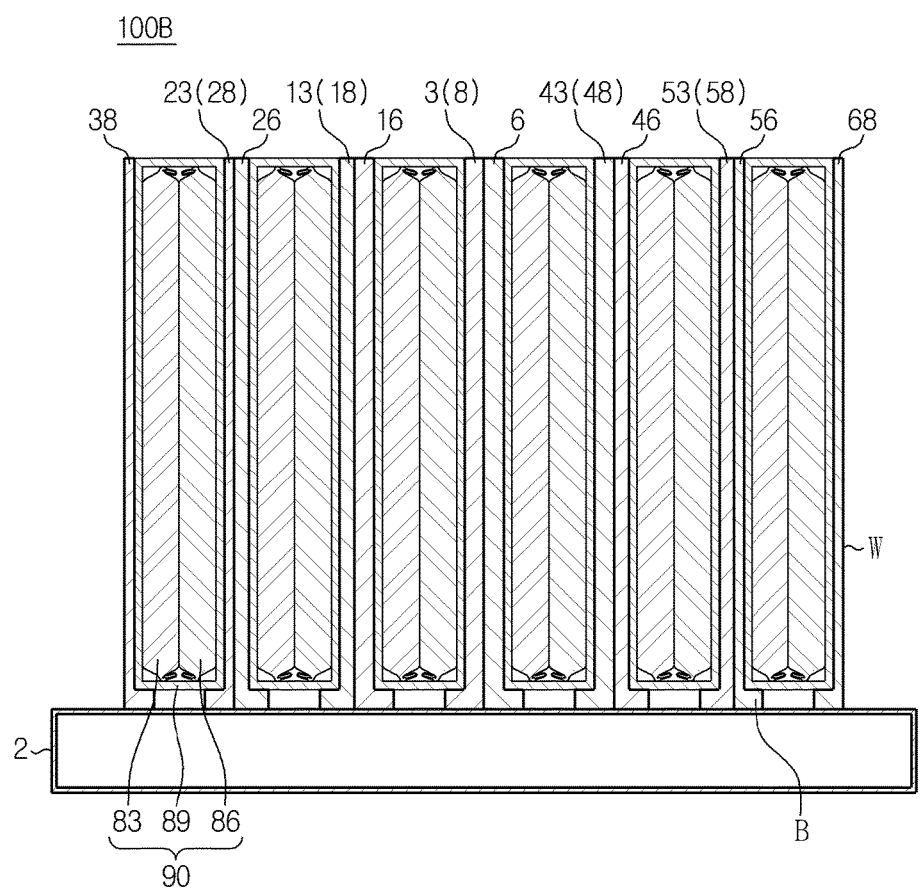
FIG. 6 is a cross-sectional view illustrating another modification of the battery module of FIG. 4.

FIG. 6 is a cross-sectional view illustrating another modification of a battery module of FIG. 4.

Referring to FIG. 6, a battery module 100B includes similar elements to those of the battery module 100 of FIG. 4. However, each of a plurality of battery units 90 in the battery module 100B includes at least two battery cells 83 and 86 and a cartridge 89 configured to receive the two battery cells 83 and 86 therein. Respective cartridges 89 are arranged at the same height level between the plurality of cooling fins 8, 18, 28, 38, 48, 58, and 68, and face-contact cooling fins arranged at left and right.

Though not essential, each cartridge 89 shown in FIGS. 5 and 6 may have a window exposing a flat surface of a battery cell received therein. An exposed surface of each battery cell may directly contact a surface of a cooling fin facing the flat surface of the battery cell. In this case, heat generated from each battery cell may be swiftly transferred to the cooling fin.

Figure 7:
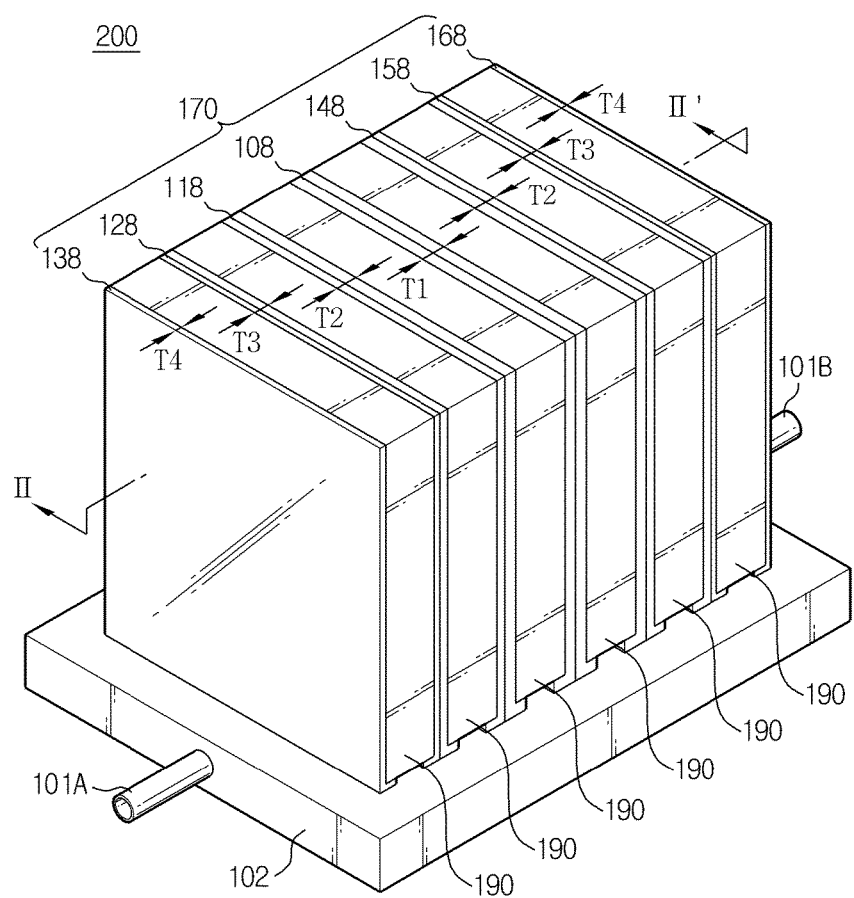
FIG. 7 is a perspective view schematically illustrating a battery module according to a second embodiment of the present disclosure.
Figure 8:
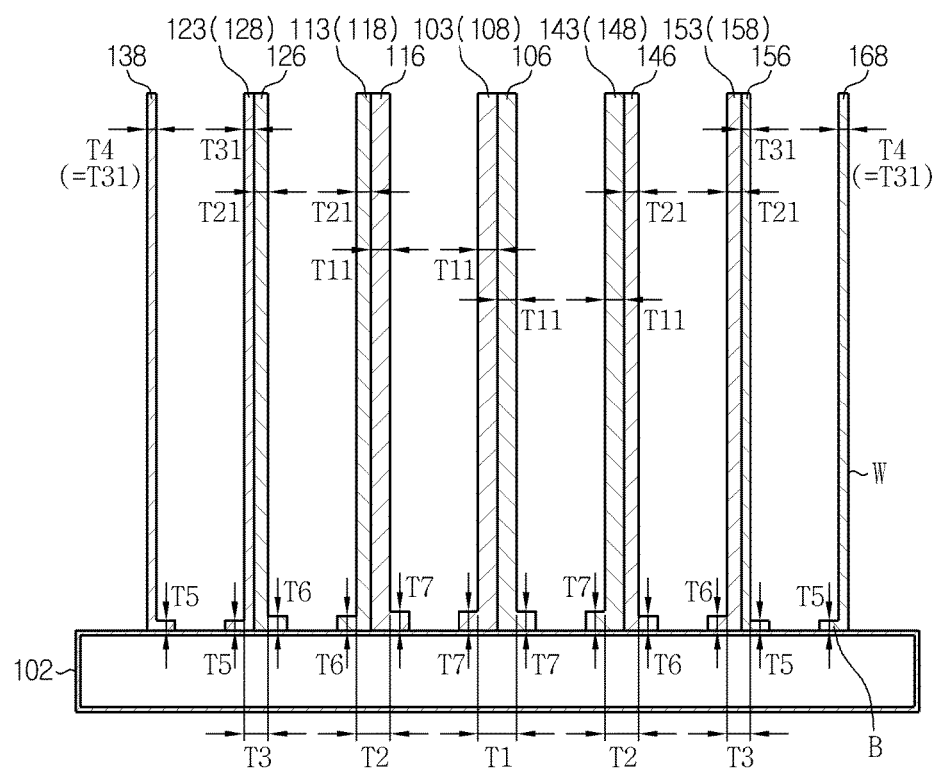
FIG. 8 is a cross-sectional view illustrating a cooling fin structure and a heat sink taken along cut line II-II' of FIG. 7.
Figure 9:
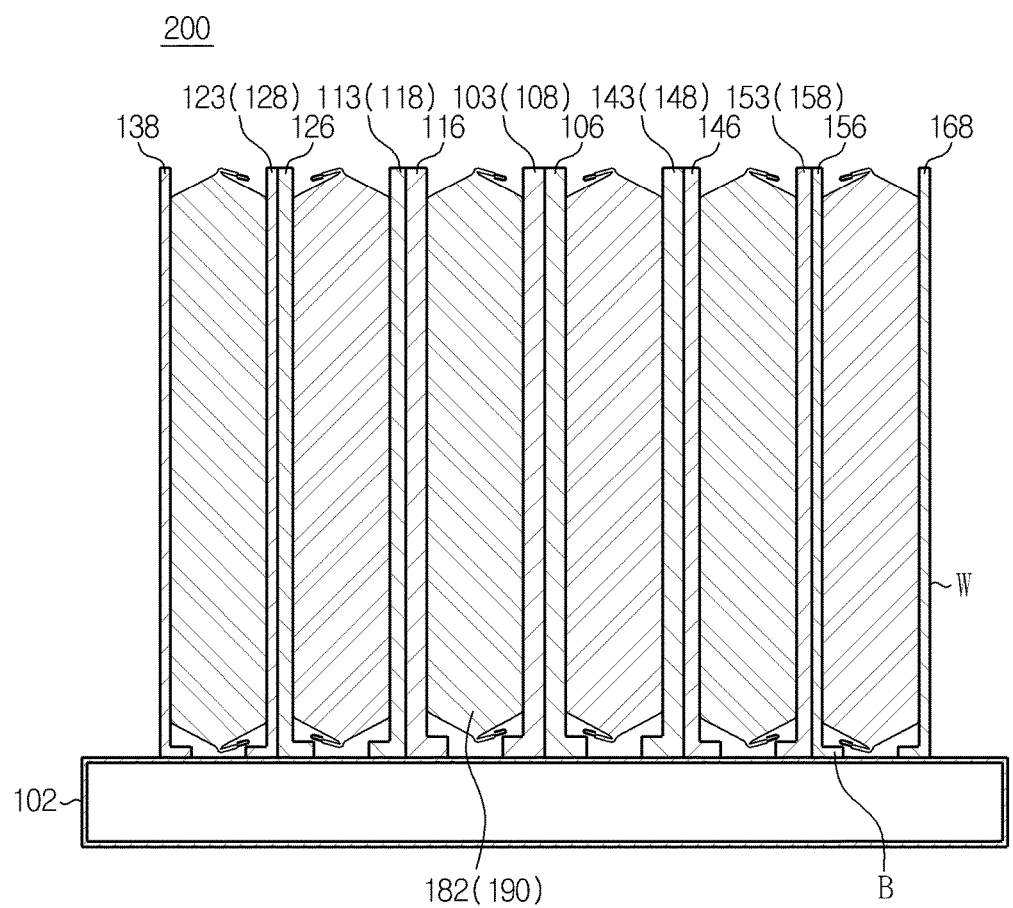
FIG. 9 is a cross-sectional view illustrating a battery module taken along cut line II-II' of FIG. 7.

FIG. 7 is a perspective view schematically illustrating a battery module according to a second embodiment, FIG. 8 is a cross-sectional view illustrating a cooling fin array and a heat sink taken along cut line II-II' of FIG. 7, and FIG. 9 is a cross-sectional view illustrating a battery module taken along cut line II-II' of FIG. 7.

Referring to FIGS. 7 to 9, a battery module 200 according to the second embodiment includes a heat sink 102, a cooling fin array 170, and a plurality of battery units 190.

The heat sink 102 is arranged under the cooling fin array 170 and the plurality of battery units 190, and has the same shape and function as those of the heat sink 2 of FIG. 1.

The cooling fin array 170 includes the first to seventh cooling fins 108, 118, 128, 138, 148, 158, and 168 arranged in one direction on the heat sink 102.

Like the first embodiment, the thicknesses of the first to seventh cooling fins 108, 118, 128, 138, 148, 158, and 168 may be gradually reduced toward the side region from the central region.

In the second embodiment, the cooling fin array 170 and the plurality of battery units 190 have a similar coupling relation to that of the cooling fin array 70 and the plurality of battery units 90 of FIG. 1.

That is, the first cooling fin 108 includes first left and right sub-cooling fins 103 and 106. The second cooling fin 118 includes second left and right sub-cooling fins 113 and 116. The third cooling fin 128 includes third left and right sub-cooling fins 123 and 126. The fifth cooling fin 148 includes fifth left and right sub-cooling fins 143 and 146. The sixth cooling fin 158 includes sixth left and right sub-cooling fins 153 and 156. Each of the first, second, third, fifth, sixth left and right sub-cooling fins 103, 106, 113, 116, 123, 126, 143, 146, 153, and 156, and the fourth and seventh cooling fins 138 and 168 has a ' ∟ ' shape or a ' ⌐ ' shape as illustrated in the drawings.

The first, second, third, fifth, sixth left and right sub-cooling fins 103, 106, 113, 116, 123, 126, 143, 146, 153, and 156, and the fourth and seventh cooling fins 138 and 168 corresponding to outer cooling fins have lateral walls W of thicknesses respectively corresponding to those of the first, second, third, fifth, sixth left and right sub-cooling fins 3, 6, 13, 16, 23, 26, 43, 46, 53, and 56, and the fourth and seventh cooling fins 38 and 68 corresponding to the outer cooling fins.

However, the thickness of the stand B of the first, second, third, fifth, sixth left and right sub-cooling fins 103, 106, 113, 116, 123, 126, 143, 146, 153, and 156, and the fourth and seventh cooling fins 138 and 168 are gradually reduced toward the outer side from the central region.

Specifically, the first left and right sub-cooling fins 103 and 106 are arranged at the central region between the plurality of battery units 190 and have stands B of the same thickness T7. Also, a thickness T6 of a stand B of the second left sub-cooling fin 113 is less than the thickness T7 of a stand B of the second right sub-cooling fin 116. Also, a thickness T5 of a stand B of the third left sub-cooling fin 123 is less than the thickness T6 of a stand B of the third right sub-cooling fin 126.

Similarly, the thickness T7 of a stand B of the fifth left sub-cooling fin 143 is greater than the thickness T6 of a stand B of the fifth right sub-cooling fin 146. Also, the thickness T6 of a stand B of the sixth left sub-cooling fin 153 is greater than the thickness T5 of a stand B of the sixth right sub-cooling fin 156.

Meanwhile, the fourth and seventh cooling fins 138 and 168 corresponding to the outer cooling fins have stands B of the same thickness T5.

According to another aspect, the stands B of sub-cooling fins facing each other and surrounding the battery unit 190 in a sandwich structure at left and right may have the same thickness. For example, the thicknesses T7 of the stands B of the first left sub-cooling fin 103 and the second right sub-cooling fin 116 may be the same. Likewise, in FIG. 8, the stand B having the same reference numeral denoting a thickness may have the same thickness.

Figure 10:
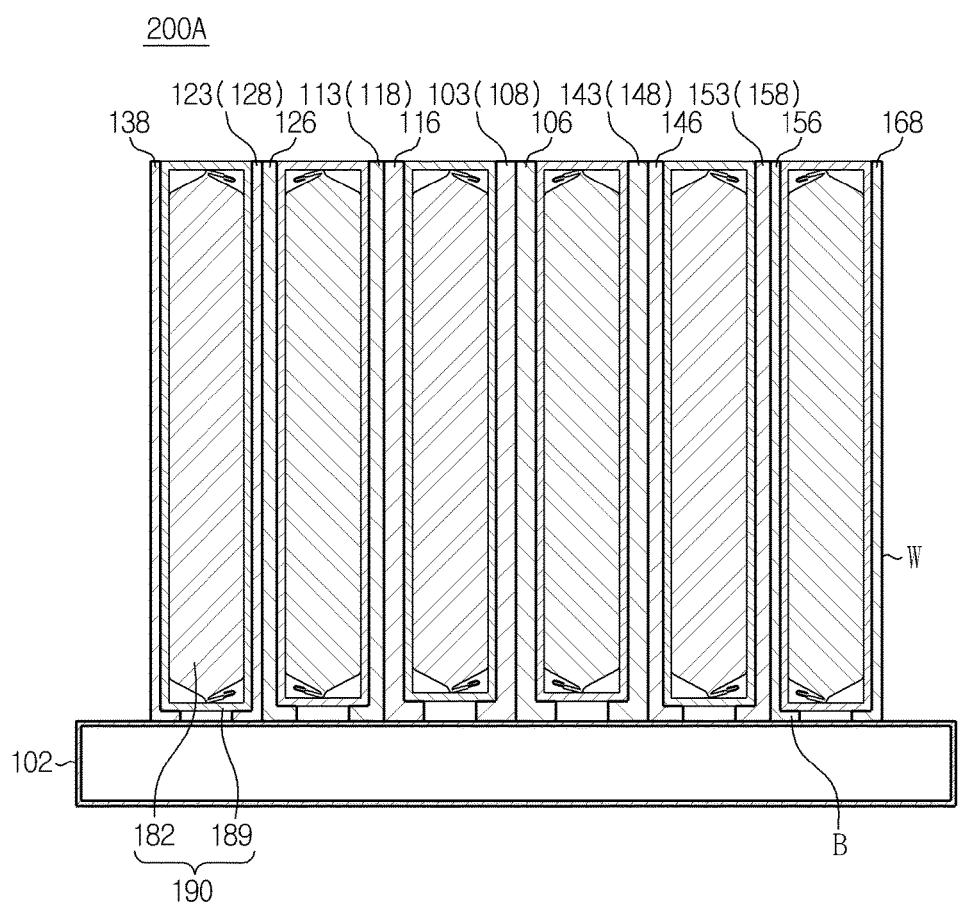
FIG. 10 is a cross-sectional view illustrating a modification of a battery module of FIG. 9.

FIG. 10 is a cross-sectional view illustrating a modification of a battery module of FIG. 9.

Referring to FIG. 10, a battery module 200A includes similar elements to those of the battery module 200 of FIG. 9. However, each of a plurality of battery units 190 in the battery module 200A includes at least one battery cell 182 and a cartridge 189 configured to receive the battery cell 182 therein. Respective cartridges 189 have heights increasing toward the side region from the central region. This is because thicknesses of stands B forming left and right sub-cooling fins surrounding the respective cartridges 189 are gradually reduced toward the side region from the central region. Also, the respective cartridges 189 may be arranged at the same height level between the plurality of cooling fins 108, 118, 128, 138, 148, 158, and 168 with respect to an upper surface of the heat sink 102.

Figure 11:
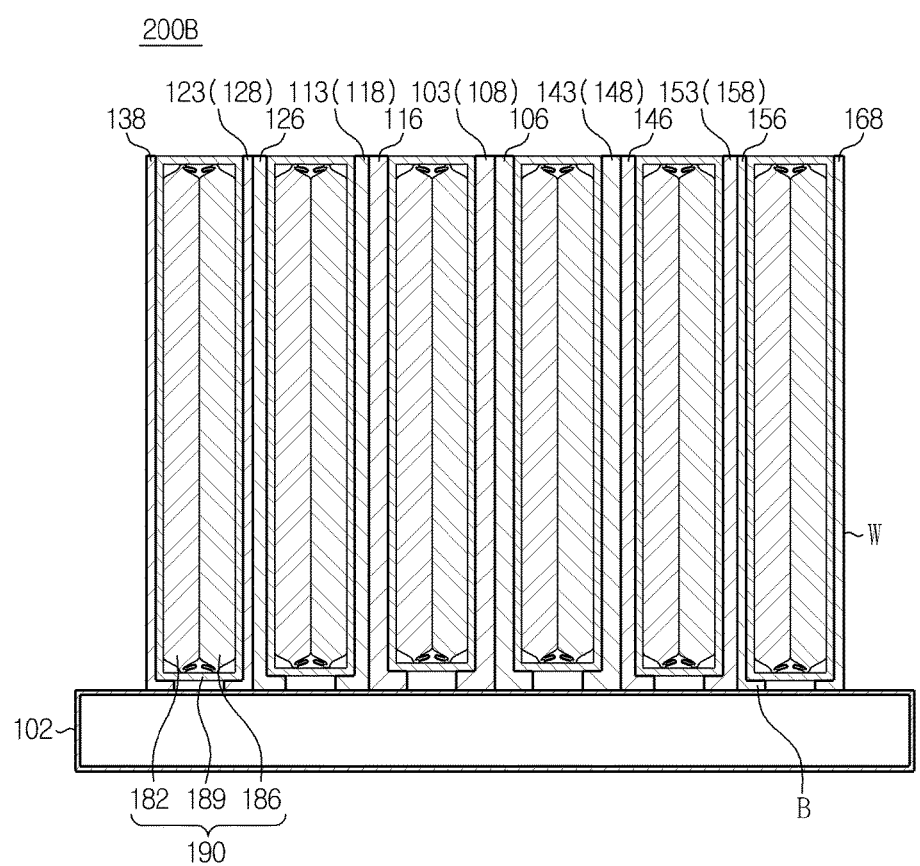
FIG. 11 is a cross-sectional view illustrating another modification of a battery module of FIG. 9.

FIG. 11 is a cross-sectional view illustrating another modification of a battery module of FIG. 9.

Referring to FIG. 11, a battery module 200B includes similar elements to those of the battery module 200 of FIG. 9. However, each of a plurality of battery units 190 in the battery module 200B includes at least two battery cells 182 and 186 and a cartridge 189 configured to receive the two battery cells 182 and 186 therein. Respective cartridges 189 have heights increasing toward the side region from the central region. This is because thicknesses of stands B forming left and right sub-cooling fins surrounding the respective cartridges 189 are gradually reduced toward the side region from the central region. Also, the respective cartridges 189 are arranged at the same height level between the plurality of cooling fins 108, 118, 128, 138, 148, 158, and 168 with respect to an upper surface of the heat sink 102.

Though not essential, each cartridge 189 shown in FIGS. 10 and 11 may have a window exposing a flat surface of a battery cell received therein. An exposed surface of each battery cell may directly contact a surface of a cooling fin facing the flat surface of the battery cell. In this case, heat generated from each battery cell may be swiftly transferred to the cooling fin.

Figure 12:
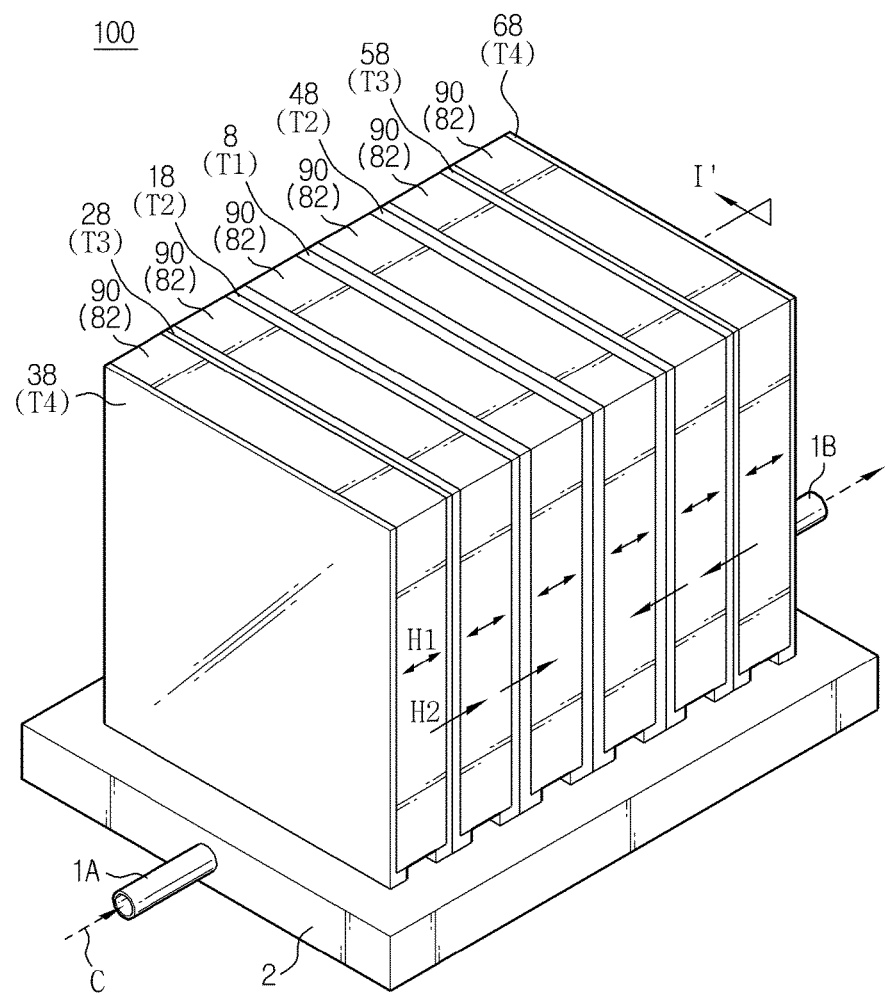
FIGS. 12 and 13 are perspective views explaining a cooling mechanism of the battery module of FIG. 1.
Figure 13:
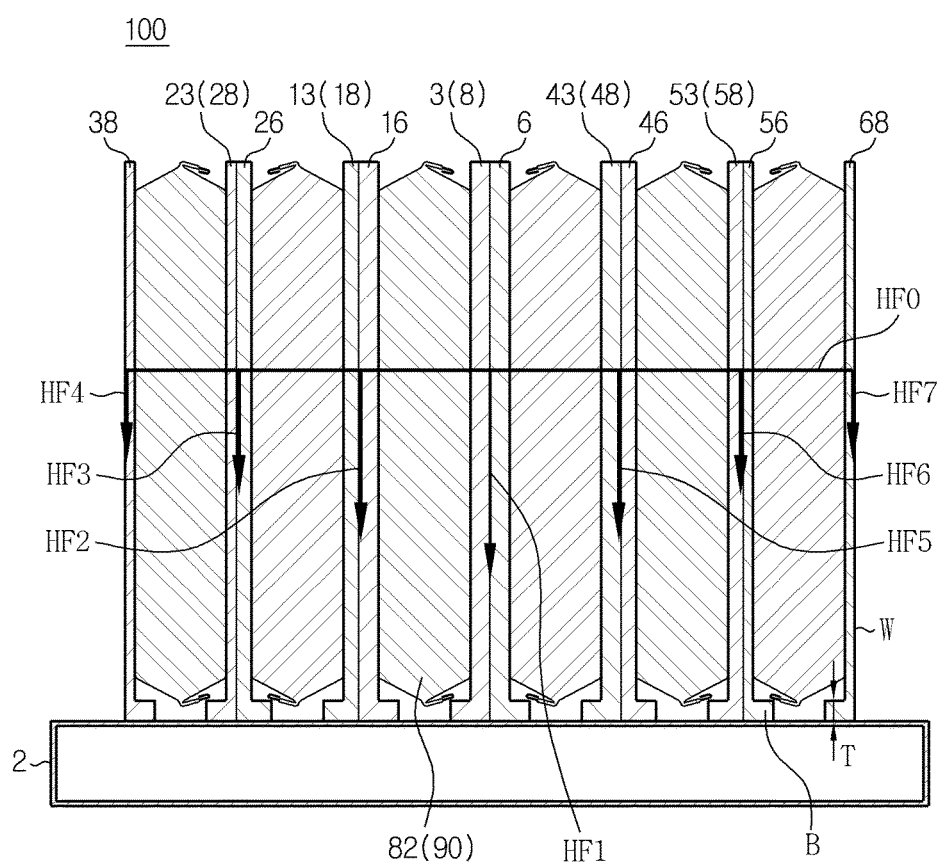

FIGS. 12 and 13 are perspective views explaining a cooling mechanism of the battery module of FIG. 1.

Referring to FIGS. 12 and 13, the battery module 100 may include the first to seventh cooling fins 8, 18, 28, 38, 48, 58, and 68, and the plurality of battery units 90 on the heat sink 2.

The thicknesses of the walls of the first to seventh cooling fins 8, 18, 28, 38, 48, 58, and 68 tend to be gradually reduced toward the outer region from the central region. The plurality of battery units 90 are arranged between the first to seventh cooling fins 8, 18, 28, 38, 48, 58, and 68.

Each of the plurality of battery units 90 may be a cartridge including at least one battery cell 90. Selectively, the cartridge may include a window configured to expose a surface of the battery cell 90, and the exposed surface of the battery cell 90 may directly contact a surface of a cooling fin facing the battery cell 90.

The heat sink 2 maintains a flow of the coolant C from the inlet 1A to the outlet 1B. Each battery unit 90 generates heat while the battery module 100 is charged or discharged. Most of the generated heat is transferred to the cooling pins surrounding each battery unit 90 (see H1), and some of the generated heat is also transferred to the central region of the battery module 100 (see H2).

Heat transferred to each cooling fin is transferred toward the heat sink 102 as illustrated in FIG. 13. In FIG. 13, directions indicated by arrows HF1 to HF7 represent heat transfer directions of respective cooling fins. Thicknesses of the respective cooling fins are gradually reduced toward the outer side from the central region of the battery module 100. Therefore, the respective cooling fins show differences in their heat transfer capability. That is, when a thickness of a cooling fin is thick, a heat transfer capability is excellent. Therefore, heat is transferred swiftly in the central portion of the battery module 100 rather than the side portion.

In FIG. 13, lengths of the arrows HF1 to HF7 show relative differences in a heat transfer capability of each cooling fin. Referring to FIG. 13, heat transfer from the central portion to the heat sink 102 of the battery module 100 is fastest, and heat transfer gradually is reduced toward the outer side of the battery module 100. Therefore, even when heat generated from the battery unit 90 arranged at the outer side of the battery module 100 is transferred to the central portion of the battery module 100, heat is not accumulated at the central portion of the battery module 100 due to fast heat transfer to the heat sink 102. Also, since heat transfer at the central portion of the battery module 100 is fast and heat transfer is slow toward the side portion of the battery module 100, the temperature of the battery module 100 may be uniformly controlled regardless of a location thereof. Therefore, a problem of a related art in which some of battery cells included in the battery module 100 deteriorate fast and thus a replacement period of the battery pack is reduced may be resolved.

Also, since a pair of bulk-type sub-cooling fins included in each cooling fin are face-to-face coupled to each other, a contact thermal resistance is remarkably lower than that of a cooling fin manufactured by repeatedly stacking three or more sheets having a thin thickness.

Also, since a thickness of each cooling fin is adjusted by a thickness of a sub-cooling fin, a contact thermal resistance between a pair of sub-cooling fins does not substantially change.

Also, according to another aspect, left and right sub-cooling fins forming each of the rest of cooling fins except the cooling fin arranged at the central portion may have different thicknesses. That is, a sub-cooling fin facing the central region is thicker than a sub-cooling fin facing the side region.

In these embodiments, heat transfer is more actively performed at the part of the sub-cooling fin facing the central region rather than at the part of the sub-cooling fin facing the side region. This is because when a cross-sectional area with respect to a direction in which heat transfer is performed increases, a thermal resistance is reduced, which provides an advantage of more effectively suppressing the occurrence of heat accumulation at the central region of the battery module 100.

Also, according to another aspect of the present disclosure, as illustrated in FIG. 8, thicknesses of stands forming the cooling fins may be gradually reduced toward the side region from the central region. In this case, heat may be discharged faster at the central region of the battery module 100. This is because when the thickness of the stand increases, a temperature gradient in the stand increases and thus a heat transfer amount to the heat sink increases.

Also, according to still another aspect of the present disclosure, in the case where a thermal conductive adhesive or a thermal conductive double-sided adhesive film is arranged between sub-cooling fins coupled to each other, a gap between the sub-cooling fins is removed and thus heat transfer performance between the sub-cooling fins may be improved even more. This is because when the gap is removed, a contact thermal resistance is reduced.

As described above, the cooling fin structure according to the present disclosure has structural characteristics that may dissipate heat at the central portion of the battery module 100 fast. Therefore, the cooling fin structure according to the present disclosure may implement a heat conduction performance equal to that of a related art even when thicknesses of cooling fins are more reduced than those of a battery module disclosed by the related art. Therefore, useful effects of improving cooling uniformity of a battery pack while more increasing energy density of the battery pack than that of the related art battery pack are expected.

The cooling mechanism of the battery module 100 is equally applied to other embodiments. Therefore, descriptions of the cooling mechanism for other embodiments are omitted.

Experimental Example

Hereinafter, experiment results that have appraised a cooling performance of a battery module according to the present disclosure are provided.

An embodiment has designed an array of cooling fins in the structure shown in FIG. 8. For a metallic material of cooling fins, aluminum has been selected. The cooling fin 108 at the center has been manufactured to a thickness of 2 mm by coupling two sub-cooling fins having a thickness of 1 mm. Also, the two cooling fins 118 and 148 adjacent to the cooling fin 108 at the center have been manufactured to a thickness of 1.4 mm by coupling a sub-cooling fin having a thickness of 1 mm to a sub-cooling fin having a thickness of 0.4 mm. Also, the two cooling fins 128 and 158 adjacent to the two cooling fins 118 and 148 have been manufactured to a thickness of 0.8 mm by coupling two sub-cooling fins having a thickness of 0.4 mm. Last, the cooling fins 138 and 168 at the outermost portion have been manufactured by using a sub-cooling fin having a thickness of 0.4 mm. In each sub-cooling fin, thicknesses of a lateral wall and a stand are the same. The sub-cooling fins have been coupled by using a double-sided adhesive film 1363-30 by 3M co.

Meanwhile, to verify effects of the present disclosure, a comparative example has designed an array of cooling fins in the structure shown in FIG. 8, and designed the cooling fins such that all sub-cooling fins have the same thickness of 0.4 mm. Therefore, the cooling fins 108, 118, 128, 148, and 158 between adjacent battery units have the same thickness of 0.8 mm, and the cooling fins 138 and 168 at the outermost portion have a thickness of 0.4 mm. In each sub-cooling fin, thicknesses of a lateral wall and a stand are the same. The sub-cooling fins have been coupled by using a double-sided adhesive film 1363-30 by 3M co.

In the embodiment and comparative examples, a battery cartridge including two pouch type battery cells having a capacity of 36 Ah has been inserted between adjacent cooling fins. The battery cartridge includes a window exposing a flat surface of a battery cell, and the exposed flat surface contacts a surface of a cooling fin. Also, a coolant circulation apparatus has been coupled to the heat sink such that water as a coolant at room temperature circulates inside the heat sink.

Next, the temperature of each battery cell has been measured while repeatedly performing charging and discharging under a downtown driving condition on the assumption that the battery module is mounted on an electric automobile, and a temperature deviation between the battery cells and a maximum temperature of the battery cells have been measured. According to the experiment, the comparative example has shown that the temperature deviation is 3.3° C. and the maximum temperature of the battery cells is 40.9° C., and the embodiment has shown that the temperature deviation is 0.5° C. and the maximum temperature of the battery cells is 38° C.

From the above experiment results, it is revealed that the present disclosure may reduce a temperature deviation between battery cells, and reduce a maximum temperature of the battery cells during a charging/discharging operation of a battery module by preventing accumulation of heat at the central region of the battery module and effectively transferring heat to the heat sink.

The present disclosure is not limited to the number of cooling fins, a material of the cooling fins, and a specific shape of the cooling fins. Therefore, a person of ordinary skill in the art will sufficiently understand that the technical features of the present disclosure lies in a structural characteristic of implementing cooling fins arranged adjacent to at least the central region in a structure of coupling two sub-cooling fins manufactured in a bulk type to each other and gradually reducing thicknesses of respective cooling fins toward the side region from the central region by adjusting thicknesses of sub-cooling fins in the battery module having a structure of arranging the plurality of cooling fins and inserting battery units between the cooling fins.

Although the present application has been described through limited embodiments and drawings, the present application is not limited thereto and it is obvious that various changes and modifications may be made by those skilled in the art to which the present application pertains within the disclosure of the present application and equivalent scope of appended claims.

INDUSTRIAL APPLICABILITY

According to the present disclosure, in an array of a plurality of cooling fins included in a battery module, a heat transfer speed from a central region of the battery module to cooling fins may be increased by increasing a thickness of cooling fins located at the central region of the battery module more than a thickness of cooling fins located at a side region. Consequently, heat accumulation at the central region of the battery module and a local increase of temperature may be prevented, and the temperature may be uniformly cooled regardless of a location in the battery module. Therefore, reduction of a replacement period of the battery module may be prevented.

Also, compared with a related art which implements a cooling fin structure by stacking a plurality of heat transfer sheets each having a same thickness, the present disclosure may increase a heat transfer speed of the central region while minimizing a loss of energy density by allowing only two sub-cooling fins to face-to-face contact to form a cooling fin, adjusting thicknesses of the sub-cooling fins, and thus increasing a thickness of a cooling fin at the central region more than a thickness of a cooling fin at the side region. That is, since a heat conduction performance relative to a thickness of a cooling fin is excellent compared with a related art, the present disclosure is usefully applicable to the technical field of an electric automobile or a hybrid automobile which requires a battery pack having high energy density.

What is claimed is:

1. A battery module comprising:
 a plurality of battery units arranged along a longitudinal axis;
 a plurality of cooling fins, wherein each cooling fin has a first portion extending in a first direction, and a second portion extending from an end of the first portion in a second direction, the second direction being substantially perpendicular to the first direction; and
 a heat sink coupled to the second portion of each of the plurality of cooling fins,
 wherein each of the plurality of battery units is sandwiched between two adjacent cooling fins of the plurality of cooling fins and contacts the first and second portions of the respective two adjacent cooling fins, the second portion of the two adjacent cooling fins facing each other and being spaced apart from each other,
 wherein among the plurality of cooling fins, a first cooling fin located at a longitudinal central region of the battery module has a greatest thickness, and
 wherein remaining cooling fins among the plurality of cooling fins have a progressively smaller thickness from the first cooling fin along the longitudinal axis.

2. The battery module of claim 1, further comprising: an outer cooling fin arranged at an outermost part of the plurality of battery units along the longitudinal direction and comprising one sub-cooling fin.

3. The battery module of claim 1, wherein an outermost cooling fin comprises a metallic plate bent in a '⌐' shape or a '⌙' shape.

4. The battery module of claim 1, wherein the plurality of cooling fins includes outermost cooling fins and inner cooling fins, and
 wherein each of the inner cooling fins has a '⊥' shape.

5. The battery module of claim 4, wherein each of the inner cooling fins comprises a pair of sub-cooling fins including a left sub-cooling fin comprising a metallic bent plate having a '⌐' shape and a right sub-cooling fin comprising a metallic bent plate having a '⌙' shape.

6. The battery module of claim 5, wherein one of the left sub-cooling fin and the right sub-cooling fin facing the central region of the plurality of cooling fins has a greater thickness than a thickness of the other of the left sub-cooling fin and the right sub-cooling fin facing the side region of the plurality of cooling fins.

7. The battery module of claim 1, wherein the first portion of the plurality of cooling fins have a gradually reducing thickness from the first cooling fin along the longitudinal direction.

8. The battery module of claim 1, wherein each battery unit comprises at least one battery cell and a cartridge configured to receive the at least one battery cell therein.

9. The battery module of claim 8, wherein the cartridge comprises a window exposing a flat surface of the at least one battery cell, and the flat surface exposed via the window face-to-face contacts a surface of a cooling fin facing the flat surface.

10. The battery module of claim 1, wherein the heat sink comprises an inlet through which a coolant is introduced and an outlet through which the coolant is discharged.

11. The battery module of claim 5, wherein the pair of sub-cooling fins are bonded to each other through a thermal conductive adhesive or a thermal conductive double-sided adhesive film.

\* \* \* \* \*